A. J. REED.
Hay-Slide.
No. 161,637.
Patented April 6, 1875.
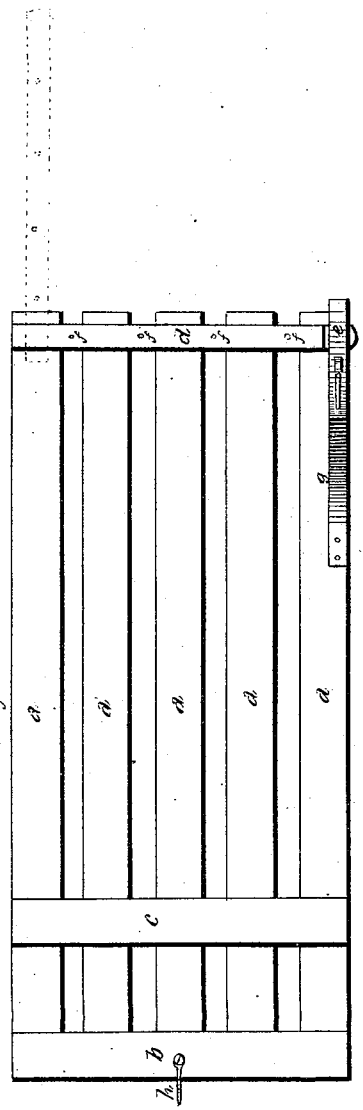
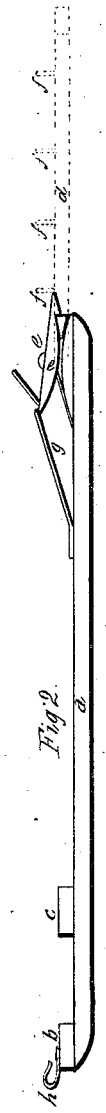
WITNESSES.
J. W. Lawer,
Chas. W. Lemon.
INVENTOR
Andrew J. Reed
per F. A. Lehmann
Att'y

UNITED STATES PATENT OFFICE.

ANDREW J. REED, OF PLEASANT GROVE, INDIANA.

IMPROVEMENT IN HAY-SLIDES.

Specification forming part of Letters Patent No. 161,637, dated April 6, 1875; application filed February 13, 1875.

*To all whom it may concern:*

Be it known that I, ANDREW J. REED, of Pleasant Grove, in the county of Jasper and State of Indiana, have invented certain new and useful Improvements in Hay-Slides; and I do hereby declare the following to be a full, clear, and exact description of the invention, such as will enable others skilled in the art to which it pertains to make and use it, reference being had to the accompanying drawings, which form part of this specification.

My invention relates to an improvement in hay-slides; and consists in an implement upon which hay-cocks can be readily placed and carried where the hay-stacks are to be made, and which implement unloads itself when required, as will be more fully described hereafter.

The accompanying drawing represents my invention.

$a$ represents a number of boards of suitable width, and of a length to answer the purpose for which they are intended. The boards are fastened at one end to a cross-piece, $b$, and so distributed as to leave an open space between them. A second cross-piece, $c$, is fastened to the boards in the same manner as the former, at a short distance from it, and by this means the boards are kept in a fixed position. Near the rear end of one of the outside boards is pivoted a cross-bar, $d$, extending over the boards to the opposite side, and which may swing backward when the spring-catch $e$, which is placed on the outside board opposite to the pivoted end of the cross-bar $d$, is pressed down, so as to release the loose end of the bar.

Along the center of the cross-bar $d$ is a row of pins, $f$, which serve to hold the hay on the slide, to keep it from slipping off, and a guard, $g$, prevents the hay from being caught under the spring-catch. The ends of the boards under the cross-piece $b$ are rounded from the ground upward, so that the slide may pass over uneven ground without catching, and a hook, $h$, is fastened on the top in the middle of the cross-piece $b$, for the attachment of draft-animals.

The advantages of this implement consist in the ease with which it may be loaded, drawn to the place where the hay is wanted, and there unloaded by bearing against a rod or lever, $i$, inserted in a hole in one end of the spring-catch, which allows the cross-bar $d$ to slip out and swing around, when the hay will be left in place, and the slide be drawn from under it.

Having thus described my invention, I claim—

1. The combination of boards $a$, cross-bar $b$, with the pins $i$, and the spring-catch $e$, substantially as and for the purpose set forth.

2. The combination, with the spring-catch $e$, of the guard $g$, substantially as and for the purpose set forth.

In testimony that I claim the foregoing I have hereunto set my hand this 8th day of February, 1875.

ANDREW JACKSON REED.

Witnesses:
   T. E. WILLEY,
   HORACE E. JAMES.